(12) United States Patent
Fukawatase et al.

(10) Patent No.: US 8,770,618 B2
(45) Date of Patent: Jul. 8, 2014

(54) CURTAIN AIRBAG DEVICE

(71) Applicants: Osamu Fukawatase, Miyoshi (JP); Hiroyuki Taguchi, Toyota (JP)

(72) Inventors: Osamu Fukawatase, Miyoshi (JP); Hiroyuki Taguchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/714,028

(22) Filed: Dec. 13, 2012

(65) Prior Publication Data

US 2013/0154245 A1    Jun. 20, 2013

(30) Foreign Application Priority Data

Dec. 15, 2011    (JP) ................. 2011-274564

(51) Int. Cl.
*B60R 21/276*    (2006.01)

(52) U.S. Cl.
USPC .................. 280/730.2; 280/729; 280/742

(58) Field of Classification Search
USPC ...................... 280/729, 730.2, 742
See application file for complete search history.

(56) References Cited

U.S. PATENT DOCUMENTS

| | | | | |
|---|---|---|---|---|
| 6,042,141 A | * | 3/2000 | Welch et al. ............ | 280/729 |
| 6,135,493 A | * | 10/2000 | Jost et al. ............ | 280/730.2 |
| 6,338,498 B1 | * | 1/2002 | Niederman et al. ........ | 280/728.2 |
| 6,830,262 B2 | * | 12/2004 | Sonnenberg et al. ....... | 280/730.2 |
| 7,198,289 B2 | * | 4/2007 | Takahara ................ | 280/730.2 |
| 7,264,267 B2 | * | 9/2007 | Kino et al. ............. | 280/728.2 |
| 2004/0119270 A1 | | 6/2004 | Gu et al. | |

FOREIGN PATENT DOCUMENTS

| | | |
|---|---|---|
| JP | 2001-328503 A | 11/2001 |
| JP | 2003-320920 A | 11/2003 |
| JP | 2004-210257 A | 7/2004 |

* cited by examiner

*Primary Examiner* — Paul N Dickson
*Assistant Examiner* — Timothy Wilhelm
(74) *Attorney, Agent, or Firm* — Gifford, Krass, Sprinkle, Anderson & Citkowski, P.C.

(57) ABSTRACT

A curtain airbag device that is housed at a top edge portion of a side window glass placement location of a vehicle body, and the curtain airbag device comprising a gas supply passage that receives supplied gas and is deployed along a top portion of the side window glass placement location and towards a vehicle bottom direction; an occupant protection portion that is deployed to a lower side of the gas supply passage by receiving supplied gas through the gas supply passage; a gas release section that releases gas from inside the gas supply passage when an internal pressure of the gas supply passage reaches a specific pressure or higher, the specific pressure being higher than a design deployment pressure; and an internal pressure regulation chamber that accepts gas released by the gas release section.

6 Claims, 5 Drawing Sheets

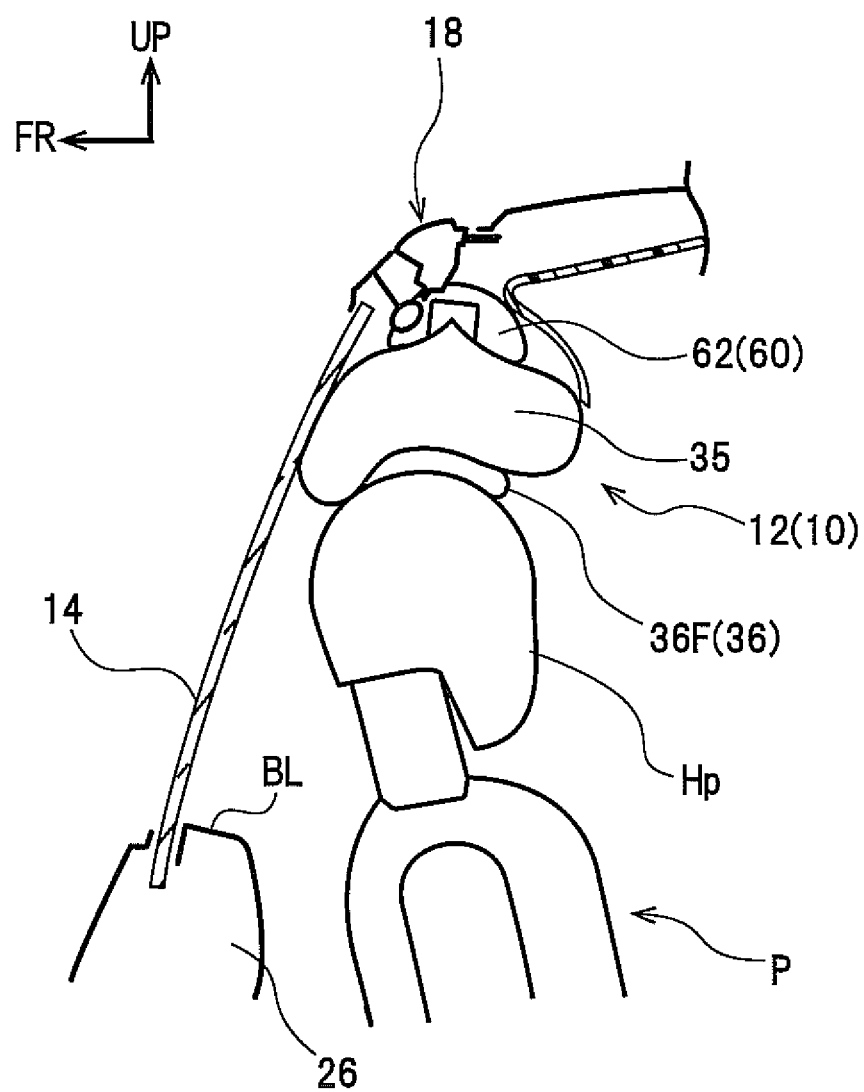

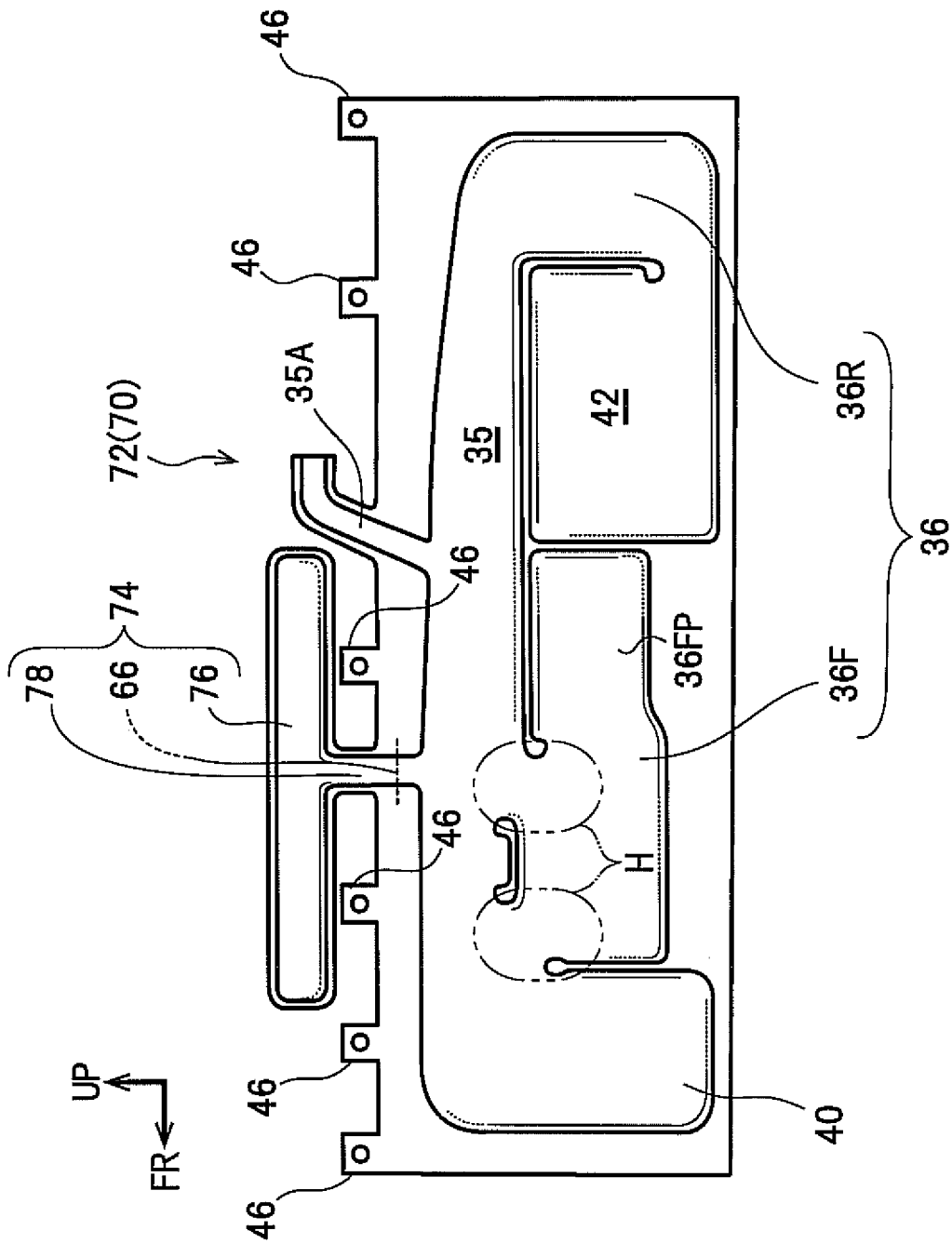

CURTAIN AIRBAG DEVICE

CROSS-REFERENCE TO RELATED APPLICATION

This application claims priority under 35 USC 119 from Japanese Patent Application, No. 2011-274564 filed on Dec. 15, 2011, the disclosure of which is incorporated by reference herein.

BACKGROUND OF THE INVENTION

1. Technical Field

The present invention relates to a curtain airbag device.

2. Related Art

Technology provided with an internal pressure control chamber is known, for example such as that disclosed in Japanese Patent Application Laid-Open (JP-A) No. 2003-320920. When the internal pressure of a cushion chamber of a curtain airbag, deployed for example during a side impact, reaches a specific pressure or higher, a closed-off portion that is closed off by adhesive is opened and gas is introduced to the internal pressure control chamber from the cushion chamber.

SUMMARY

However, in the above technology, the internal pressure control chamber is disposed at a lower portion of the curtain airbag. There is accordingly concern regarding the internal pressure of a deployed portion of the curtain airbag becoming excessive than an intended pressure in cases in which deployment of the curtain airbag is impeded partway through.

The present invention is directed towards obtaining a curtain airbag device that can suppress an increase in internal pressure of a gas supply passage in cases in which an occupant protection portion does not deploy correctly.

A curtain airbag device of a first aspect of the present invention is housed at a top edge portion of a side window glass placement location of a vehicle body, and the curtain airbag device includes: a gas supply passage that receives supplied gas and is deployed along a top portion of the side window glass placement location and towards a vehicle bottom direction; an occupant protection portion that is deployed to a lower side of the gas supply passage by receiving supplied gas through the gas supply passage; a gas release section that releases gas from inside the gas supply passage when internal pressure of the gas supply passage reaches a specific pressure or higher, the specific pressure being higher than a design deployment pressure; and an internal pressure regulation chamber that accepts gas released by the gas release section.

In this device, when gas is supplied to the gas supply passage during for example a side impact to the vehicle, the gas is supplied to the occupant protection portion through the gas supply passage, and the occupant protection portion expands and deploys. The occupant is accordingly protected against the side impact. There is however a concern that deployment of the occupant protection portion might be impeded by the occupant in cases in which the occupant has adopted an incorrect (unusual) sitting posture, for example resting against the side window glass side. In such cases, the gas release section functions when the internal pressure of the gas supply passage increases above the design deployment pressure and reaches the specific pressure or greater. When this occurs, gas inside the gas supply passage is let out from the gas supply passage by the gas release section and is accepted into the internal pressure regulation chamber.

In the curtain airbag device configured as above, the internal pressure of the gas supply passage can accordingly be suppressed from increasing in cases in which the occupant protection portion does not deploy correctly. The internal pressure of the gas supply passage is accordingly lowered to below the specific pressure, preventing or effectively suppressing the gas supply passage with a high internal pressure from interacting with the occupant.

A curtain airbag device of a second aspect of the present invention is the first aspect wherein: the internal pressure regulation chamber is integrally provided to the gas supply passage at a vehicle top side of the gas supply passage; and the gas release section is configured such that when the internal pressure of the gas supply passage reaches the specific pressure or higher, the internal pressure causes a closed-off state between the gas supply passage and the internal pressure regulation chamber to change to a communicated state.

When deployment of the occupant protection portion is impeded in this device, the gas release section is changed from the closed-off state to the communicated state due to the internal pressure of the gas supply passage increasing to the specific pressure or higher, and gas inside the gas supply passage is accepted into the internal pressure regulation chamber through the gas release section. Since the internal pressure regulation chamber is integrally provided to the top side of the gas supply passage, gas from the gas supply passage can be efficiently accepted into the internal pressure regulation chamber when deployment of the occupant protection portion is impeded although the occupant protection portion is supposed to deploy below the gas supply passage.

A curtain airbag device of a third aspect of the present invention is the second aspect wherein: the curtain airbag device further includes plural attachment tabs that project out towards the vehicle top from a vehicle top end side of the gas supply passage at intervals along the vehicle front-rear direction, and that are respectively attached to the top edge portion; and the internal pressure regulation chamber is disposed between the plural attachment tabs.

In this device, the space is efficiently used since the internal pressure regulation chamber is disposed between the plural attachment tabs. The curtain airbag configured with the gas supply passage, the occupant protection portion and the internal pressure regulation chamber can also be manufactured with a good yield.

A curtain airbag device of a fourth aspect of the present invention is the second aspect wherein: the curtain airbag device further includes plural attachment tabs that project out towards the vehicle top from a vehicle top end side of the gas supply passage at intervals along the vehicle front-rear direction, and that are respectively attached to the top edge portion; and the internal pressure regulation chamber projects out further than the plural attachment tabs with respect to the gas supply passage.

In the device of the fourth aspect, since the internal pressure regulation chamber projects out beyond the attachment tabs, there are few limitations to the capacity of the internal pressure regulation chamber, and the internal pressure of the gas supply passage can be suppressed to a low level after actuation of the gas release section.

A curtain airbag device of a fifth aspect of the present invention is any one of the second aspect to the fourth aspect wherein the gas release section is configured such that a communication passage between the gas supply passage and the internal pressure regulation chamber is closed-off by sewing or adhering so as to split or come apart due to the internal pressure reaching the specific pressure or higher.

In this device, a highly reliable gas release section can be obtained with a simple structure due to sewing or adhering the communication passage between the gas supply passage and the internal pressure regulation chamber so as to split or come apart due to the internal pressure reaching the specific pressure or higher.

A curtain airbag device of a sixth aspect of the present invention includes: a curtain airbag that is housed in a folded up state at a top edge portion of a side window glass placement location of a vehicle body, and that receives supplied gas and is deployed along the side window glass and towards a vehicle bottom direction; a gas release section that releases gas inside the curtain airbag from an upper portion of the curtain airbag when internal pressure of the curtain airbag reaches a specific pressure or higher, the specific pressure being higher than a design deployment pressure; and an internal pressure regulation chamber that accepts gas released by the gas release section.

In this device, when gas is supplied to the curtain airbag during for example a side impact to the vehicle, the curtain airbag expands and deploys. The occupant is accordingly protected against the side impact. There is however a concern that deployment of a lower portion of the curtain airbag may be impeded by the occupant in cases in which the occupant has adopted an incorrect (unusual) sitting posture, for example resting against the side window glass side. In such cases, the gas release section functions when the internal pressure of the curtain airbag increases beyond a design deployment pressure and reaches the specific pressure or greater during the deployment process. When this occurs, a portion of the gas inside the curtain airbag is let out from the upper portion of the curtain airbag (for example a region above the center of gravity of the head of the occupant) by the gas release section and accepted into the internal pressure regulation chamber.

A curtain airbag device of a seventh aspect of the present invention is the third aspect wherein plural of the gas release sections and plural of the internal pressure regulation chambers are provided.

In this device, the desired gas release capacity can be secured due to providing the plural gas release sections and the plural internal pressure regulation chambers.

A curtain airbag device of an eighth aspect of the present invention is the first aspect wherein: the occupant protection portion includes a front main chamber that protects a front seat occupant and a rear main chamber that protects a rear seat occupant; and the gas release section and the internal pressure regulation chamber are disposed at a vehicle front side of the front main chamber and to a vehicle top side with respect to the gas supply passage.

In this device, the gas release section and the internal pressure regulation chamber are disposed at a front portion of the front main chamber that protects a front seat occupant, corresponding to a portion further to the vehicle front side than a normal sitting posture and where the head of an occupant in an incorrect sitting posture may potentially be positioned. Gas from the gas release section at the vicinity of the occupant can accordingly be released when deployment of the occupant protection portion is impeded by the occupant. The load that acts on the occupant from the gas supply passage can accordingly be kept low when deployment of the occupant protection portion is impeded.

In the curtain airbag configured as above, the internal pressure of the curtain airbag can accordingly be suppressed from increasing when the lower portion of the curtain airbag does not deploy correctly. The internal pressure of the curtain airbag is accordingly lowered to below the specific pressure, preventing or effectively suppressing the gas supply passage at high internal pressure from interacting with the occupant.

As described above, the curtain airbag device according to the present invention exhibits the excellent advantageous effect of being capable of suppressing an increase in internal pressure of the gas supply passage in cases in which the occupant protection portion does not deploy correctly.

BRIEF DESCRIPTION OF THE DRAWINGS

FIG. 3A and FIG. 3B are drawings illustrating an actuated state of a curtain airbag device according to the first exemplary embodiment of the present invention, FIG. 3A is an enlarged cross-section illustrating a state in which deployment of a main chamber has been impeded, and FIG. 3B is an enlarged cross-section illustrating a normal occupant protection state; and FIG. 4 is a side view of a curtain airbag configuring a curtain airbag device according to a second exemplary embodiment of the present invention prior to cutting away unnecessary portions.

DETAILED DESCRIPTION OF THE INVENTION

Explanation follows regarding a curtain airbag device 10 according to a first exemplary embodiment of the present invention, with reference to FIG. 1 to FIG. 3A and 3B. The arrow FR, arrow UP and arrow OUT in each of the drawings respectively indicate, as appropriate, a front direction (traveling direction), an upward direction and a vehicle width direction outside of a vehicle S applied with the curtain airbag device 10. Unless otherwise indicated, when front-rear and up-down directions are referred to in the following description, they are respectively taken to indicate a direction in the vehicle front-rear direction and a direction in the vehicle up-down direction.

Overall Configuration of the Curtain Airbag Device

Figure 1:
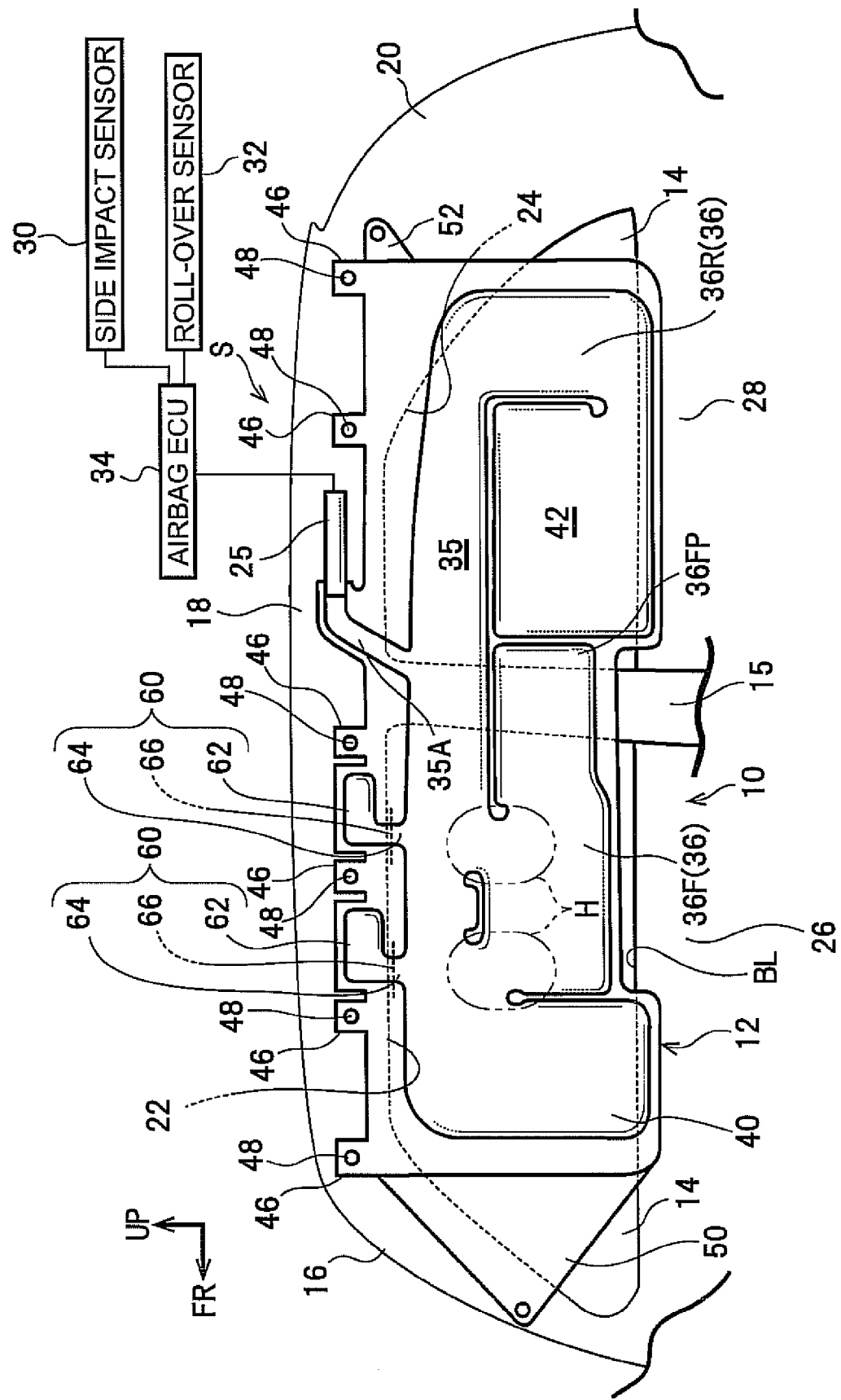
FIG. 1 is a side view illustrating a schematic overall configuration of a curtain airbag device according to a first exemplary embodiment of the present invention, as seen from a vehicle interior.

FIG. 1 is a side view of the vehicle S that is applied with the curtain airbag device 10, as viewed from the vehicle interior. As shown in FIG. 1, the curtain airbag device 10 is provided with a curtain airbag 12. The curtain airbag 12 is configured so as to deploy in a curtain shape along a side window glass 14 serving as a vehicle compartment interior section and a center pillar (B pillar) 15. In the present exemplary embodiment, the curtain airbag 12 is configured so as to cover front and rear side window glasses 14 respectively positioned at the sides of a front seat and a rear seat.

Although not shown in the drawings, the curtain airbag 12 is rolled or accordion-folded in an elongated shape, and is housed along a roof side portion 18 up to the vicinity of a rear pillar 20. The curtain airbag 12 is configured so as to, in specific cases described later, deploy along the front and rear side window glasses 14 and the center pillar 15 as shown in FIG. 1, and protect the head(s) of occupant(s) in the front and rear seats. Note that the roof side portion 18 of the present exemplary embodiment forms an upper edge of front and rear door openings 22, 24 that serve as opening portions for getting in and out and that are surrounded by the roof side portion 18, a front pillar 16, the center pillar 15 and the rear pillar 20. The curtain airbag 12 is housed at the roof side portion 18.

The curtain airbag device 10 is further provided with an inflator 25 serving as a gas generation section that supplies gas into the curtain airbag 12. Each inflator 25 is a combustion type or a cold gas type, and is configured so as to supply gas generated on actuation of the inflator 25 into the curtain airbag 12. A gas port of the inflator 25 is in communication with the interior of the curtain airbag 12. In the present exemplary embodiment, the inflator 25 is installed at the roof side portion 18.

The curtain airbag 12 and the inflator 25 described above are respectively provided at both vehicle width direction sides of the vehicle S. Namely, the curtain airbag device 10 is configured with a pair of left and right curtain airbags 12 and a pair of left and right inflators 25. As shown in FIG. 1, the curtain airbag device 10 is also provided with an airbag ECU 34 that is respectively electrically connected to a side impact sensor 30 and a roll-over sensor 32. The side impact sensor 30 is configured so as to predict or detect a side impact to the vehicle S (or the inevitability thereof) and to output a side impact detection signal to the airbag ECU 34. The roll-over sensor 32 is configured so as to predict or detect roll-over of the vehicle S (or the inevitability thereof), and output a roll-over detection signal (referred to below as an R/O detection signal) to the airbag ECU 34.

The airbag ECU 34 is respectively electrically connected to the left and right inflators 25 (only the connection to one of the inflators 25 is shown in FIG. 1), and is configured to actuate the inflator 25 on the side impact side (near side) when a side impact detection signal is input. Accordingly, when a side impact to the vehicle S occurs, the near side curtain airbag 12 receives supplied gas and is inflated and deployed. The airbag ECU 34 is further configured to actuate both vehicle width direction side inflators 25 when an R/O detection signal is input. Note that the airbag ECU 34 is configured such that when an R/O detection signal is input after a side impact, the airbag ECU 34 actuates the inflator 25 on the opposite side to the side impact side inflator 25 that was already actuated.

Explanation follows regarding a specific configuration of the curtain airbag 12. Unless otherwise indicated, explanation refers to the configuration (shape) of the curtain airbag 12 in an inflated and deployed state. The curtain airbag 12 is provided with a gas supply passage 35, a main chamber 36 that serves as an occupant protection portion, and with a front auxiliary chamber 40 and a rear auxiliary chamber 42 that are in communication with the main chamber 36 and that serve as occupant protection portions.

The gas supply passage 35 is configured so as to deploy in a cylindrical shape extending in the front-rear direction along the roof side portion 18, and is connected to the inflator 25 at a front-rear direction intermediate portion such that the inflator 25 can supply gas into the gas supply passage 35. More specifically, the inflator 25 disposed at the roof side portion 18 and the gas supply passage 35 deployed below are in communication through a gas introduction passage 35A. The gas supply passage 35 projects out at an upper portion of the curtain airbag 12 similarly to attachment tabs 46, described later, and an internal pressure regulation chamber 62, also described later. The gas supply passage 35 is accordingly configured to supply gas from the inflator 25 to each portion of the curtain airbag 12 whilst distributing the gas to front and rear. Note that the inflator 25 is not limited to a configuration disposed at the roof side portion 18, and may be disposed at the center pillar 15 or the rear pillar 20 (at the C pillar or the D pillar).

The main chamber 36 is configured so as to inflate and deploy downwards in a curtain shape at side impact head protection areas (the vicinity directly in front of both the center pillar 15 and the rear pillar 20) by receiving supplied gas from the gas supply passage 35. The main chamber 36 is configured including a front main chamber 36F for the front seat and a rear main chamber 36R for the rear seat. The front main chamber 36F and the rear main chamber 36R are in communication with each other through the gas supply passage 35 such that the front main chamber 36F and the rear main chamber 36R are respectively supplied with gas from the inflator 25 through the gas supply passage 35. A rear end side of the front main chamber 36F is configured as a pillar wrap portion 36FP that overlaps with the center pillar 15 as viewed from a side of the vehicle.

The front auxiliary chamber 40 is deployed to the front of the front main chamber 36F and configures a front end portion of the curtain airbag 12, so as to protect the head of a front seat occupant situated at the front side of the front seat in the event of a roll-over. The front auxiliary chamber 40 is configured such that an upper edge side of the front auxiliary chamber 40 is located near the front pillar 16 as viewed from the side, and a lower edge side of the front auxiliary chamber 40 is positioned below a belt line BL and overlaps with a front portion of a front side door 26 serving as a side door.

In the present exemplary embodiment, an upper portion of the front auxiliary chamber 40 is in communication with a front end of the gas supply passage 35 of the curtain airbag 12. Although not shown in the drawings, the front auxiliary chamber 40 is configured so as to be deployed in a (long upright) substantially cylindrical shape having a central axis in the up-down direction. Gas from the inflator 25 is supplied to the front auxiliary chamber 40 through the gas supply passage 35 and the front main chamber 36F.

The rear auxiliary chamber 42 is deployed to the front of the rear main chamber 36R, and configures a portion between the rear main chamber 36R and the front main chamber 36F. In the present exemplary embodiment, a portion of the lower edge side of the rear auxiliary chamber 42 is in communication with a front lower portion of the rear main chamber 36R. Also, in the present exemplary embodiment a front end of the rear auxiliary chamber 42 is partitioned from the pillar wrap portion 36FP of the front main chamber 36F. The rear auxiliary chamber 42 protects the head of a rear seat occupant situated at the front side of the rear seat in the event of a roll-over.

As shown in FIG. 1, plural attachment tabs 46 are provided along a top edge of the curtain airbag 12. The attachment tabs 46 of the curtain airbag 12 are fixed to vehicle framework (the front pillar 16, the roof side portion 18 and the rear pillar 20) by fasteners 48 such as clips or nuts and bolts that pass through each of the attachment tabs 46.

The front end, namely the front auxiliary chamber 40, of the curtain airbag 12 described above is supported at a lower portion of the front pillar 16 through a support cloth (tension cloth) 50 that is substantially triangular shaped as viewed from the side. The rear end, namely the rear main chamber 36R of the curtain airbag 12 is supported at the rear pillar 20 through a support cloth 52.

Relevant Configuration

The curtain airbag 12 is configured so as to be inflated and deployed in an overall curtain shape along the side window glasses 14 by gas supplied from the inflator 25. The curtain airbag 12 is also provided with internal pressure regulation structures 60 that release gas from inside the gas supply passage 35 when the internal pressure of the gas supply passage 35 reaches a specific pressure Ps higher than a design deployment pressure Pd, or greater. More specific explanation follows. The design deployment pressure Pd is a deployment pressure at which the curtain airbag 12 is designed to deploy normally, without impedance, and is set for example at 40 kPa. The specific pressure Ps is set, for example, at 50 kPa.

Figure 2:
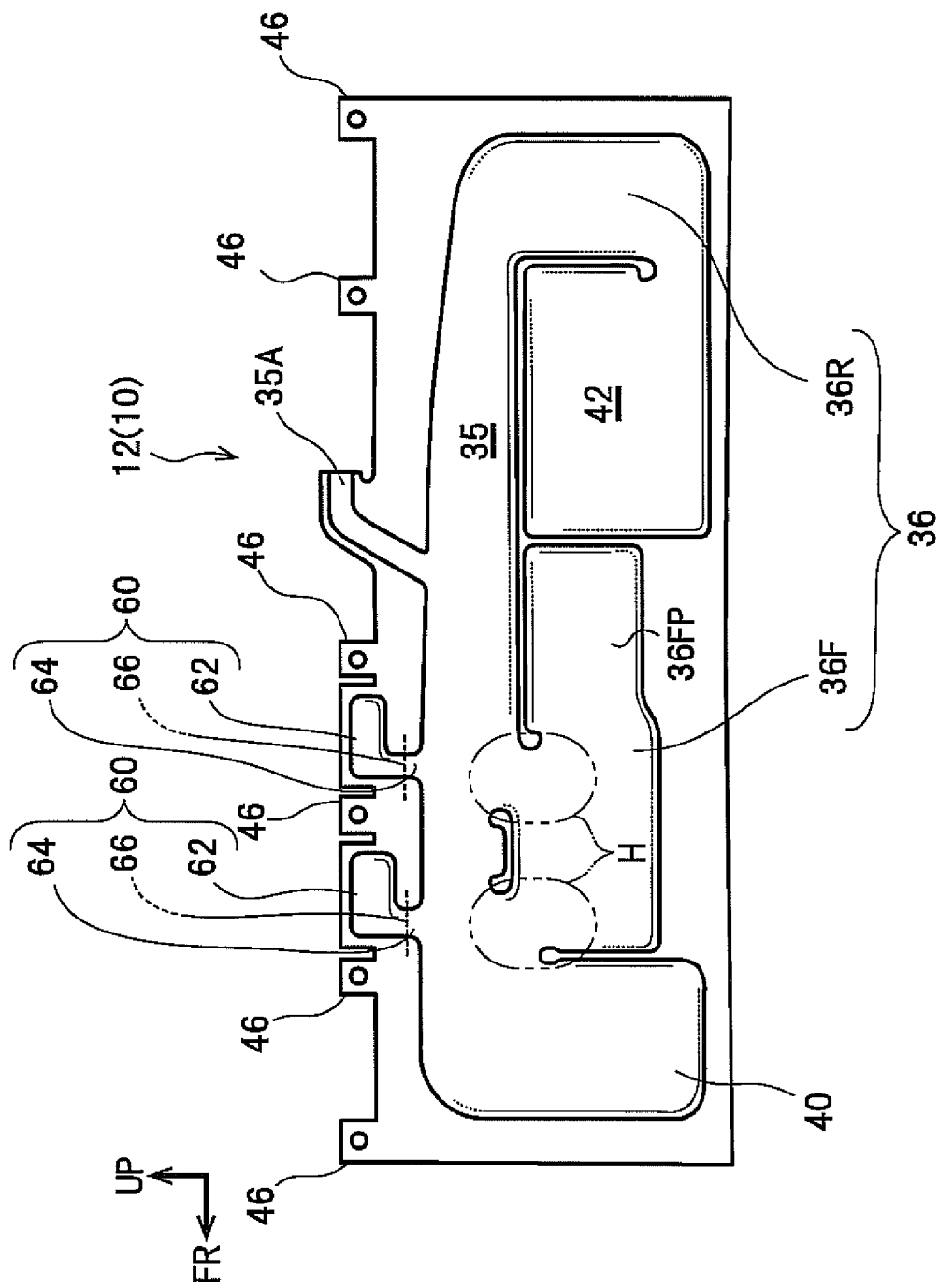
FIG. 2 is a side view of a curtain airbag configuring a curtain airbag device according to the first exemplary embodiment of the present invention prior to cutting away unnecessary portions.
Figure 3B:
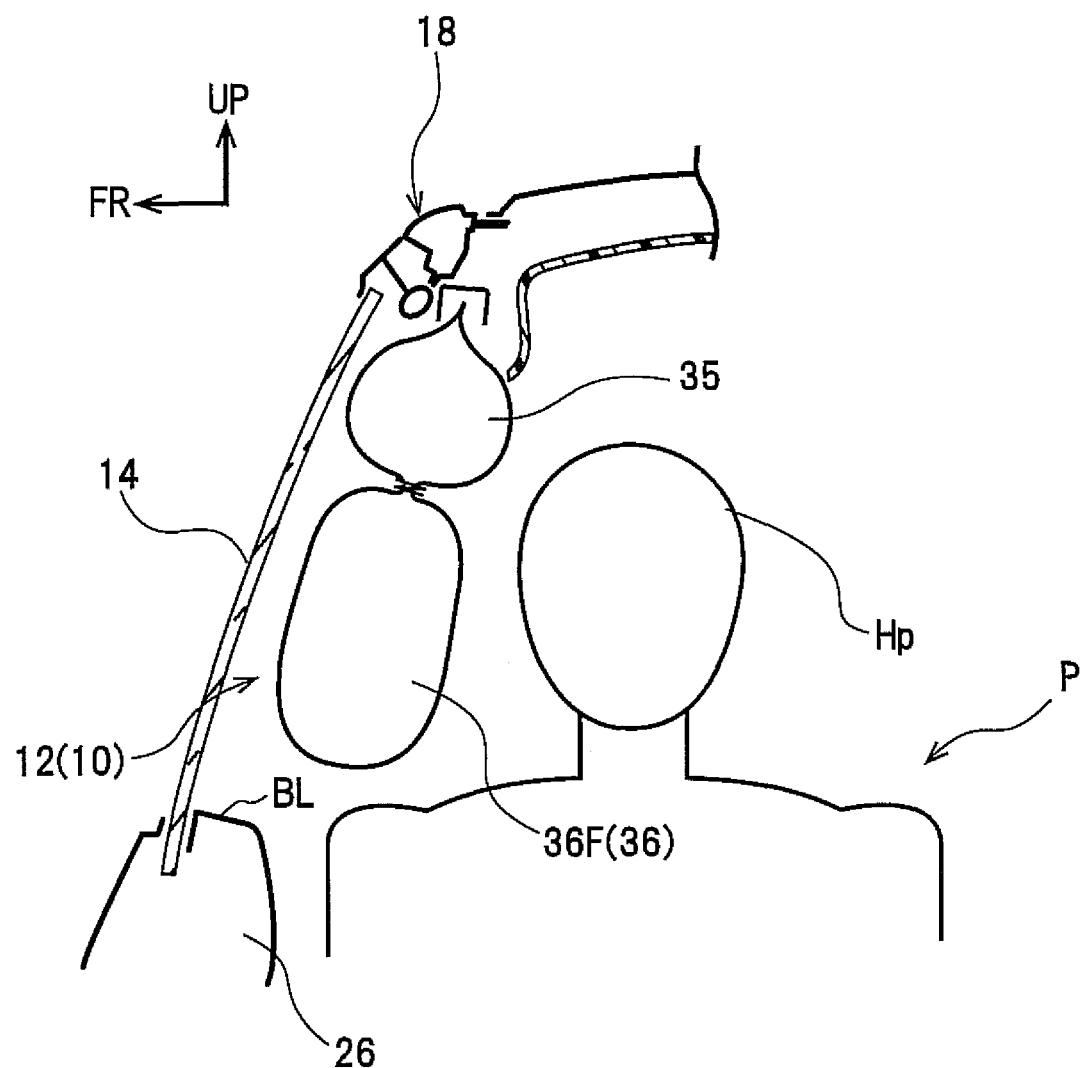

Each internal pressure regulation structure 60 is configured including the internal pressure regulation chamber 62 for accepting gas from the gas supply passage 35 and a release communication passage 64 that serves as a communication passage communicating the gas supply passage 35 and the internal pressure regulation chamber 62. As shown in FIG. 2, the release communication passage 64 is normally closed off by a tear seam 66, but the tear seam 66 splits when the internal pressure of the gas supply passage 35 reaches the specific pressure Ps or greater, thereby placing the gas supply passage 35 and the internal pressure regulation chamber 62 in communication with each other. The release communication passage 64 and the tear seam 66 accordingly correspond to a gas release section of the present invention.

Moreover, in the present exemplary embodiment, the internal pressure regulation structures 60 are disposed above the gas supply passage 35. Namely, the internal pressure regulation chambers 62 are disposed to the upper side of the gas supply passage 35, and the release communication passages 64 connect an upper edge (uppermost portion) of the gas supply passage 35 and the internal pressure regulation chambers 62 by the shortest distances (in straight line shapes). Due to this arrangement, when the internal pressure of the gas supply passage 35 reaches the specific pressure Ps or greater, due for example to the deployment of the main chamber 36 being impeded, the configuration exhibits a function to release gas through the release communication passages 64 to the internal pressure regulation chambers 62.

The internal pressure regulation structures 60 are further disposed above a front portion of the front main chamber 36F in the curtain airbag 12. To explain this arrangement further, dummy heads H shown by the double-dashed intermittent lines in FIG. 1 and FIG. 2 are examples of positions of the head of an occupant in incorrect sitting postures (out of position: OOP). For example, the dummy heads H show the head of an occupant in a bent forward position, and in a position resting against the door. The placement positions of the internal pressure regulation structures 60 are set above positions where there is a high probability of the head of an occupant being positioned due to various incorrect sitting postures.

In the present exemplary embodiment, the internal pressure regulation chambers 62 are disposed between the attachment tabs 46 at intervals in the front-rear direction. Namely, the internal pressure regulation structures 60 are disposed so as to effectively use a space between the attachment tabs 46. In the present configuration, plural (two in the example illustrated) of the internal pressure regulation structures 60 are provided in order to secure the gas acceptance capacity of the internal pressure regulation chambers 62 (internal pressure reduction effect for the gas supply passage 35).

The curtain airbag 12 described above may be configured for example by superimposing and sewing together substantially rectangular shaped base cloths, as shown in side view in FIG. 2, or by pocket weaving with a weaving machine (not shown in the drawings). The curtain airbag 12 is thereby integrally formed including each of the gas supply passage 35, the gas introduction passage 35A, the main chamber 36, the front auxiliary chamber 40, the rear auxiliary chamber 42, the attachment tabs 46, the internal pressure regulation chambers 62 and the release communication passage 64. Note that the curtain airbag 12 is trimmed from the state shown in FIG. 2 to the shape shown in FIG. 1 by cutting off excess base cloth using for example a laser.

Explanation follows regarding operation of the first exemplary embodiment.

When the vehicle S applied with the curtain airbag device 10 configured as described above is involved in a side impact, the airbag ECU 34 receives a side impact detection signal from the side impact sensor 30 and actuates the inflator 25 on the side where the side impact has occurred. When this happens, the curtain airbag 12 receives supplied gas from the inflator 25 and inflates, deploying the main chamber 36 of the curtain airbag 12, namely the front main chamber 36F and the rear main chamber 36R. Accordingly the head Hp of a front seat occupant P on the side impact side is protected by the front main chamber 36F (see FIG. 3B), and the head of a rear seat occupant on the side impact side is protected by the rear main chamber 36R (not shown in the drawings).

Further, the front auxiliary chamber 40 and the rear auxiliary chamber 42 are deployed on the side impact side, and preparation for protecting the occupants against roll-over is instigated. When a roll-over occurs to the vehicle S following a side impact, the airbag ECU 34 receives an R/O detection signal from the roll-over sensor 32 and actuates the inflator 25 on the opposite side to the side impact side. However, when a roll-over occurs to the vehicle S independently of a side impact, the airbag ECU 34 receives an R/O detection signal from the roll-over sensor 32 and actuates the inflators 25 on both the left and right sides.

The curtain airbags 12 on both vehicle width direction sides are thereby deployed fully, and the heads of the occupants are protected against roll-over. Namely, displacement of the heads of the occupants in the vehicle width direction is respectively suppressed at each portion in the front-rear direction.

In the curtain airbag device 10, the internal pressure regulation structures 60 are provided to the curtain airbags 12. There is a concern that when a side impact occurs in a state in which the occupant(s) have adopted an incorrect (unusual) sitting posture, due to this incorrect (unusual) posture, deployment of the main chamber 36 might be impeded by for example the head Hp of the occupant P, as shown in FIG. 3A. In a comparative example in which the internal pressure regulation structures 60 are not provided, since gas from the inflator 25 is not supplied through the gas supply passage 35, for example to the main chamber 36, this leads to the internal pressure of the gas supply passage 35 increasing to for example in the region of 80 kPa. The load acting on the head Hp from the gas supply passage 35 readily becomes large when such a gas supply passage 35 with a high internal pressure interacts (makes contact) with the head Hp of the occupant P.

By contrast, in the curtain airbag device 10, when the internal pressure of the gas supply passage 35 reaches the specific pressure Ps (for example 50 kPa) or higher, the tear seams 66 split under the internal pressure and the release communication passages 64 are opened. Gas in the gas supply passage 35 is accordingly accepted into the internal pressure regulation chambers 62 through the release communication passages 64. In other words, as shown in FIG. 3A, the bag capacity above the gas supply passage 35 increases, thereby lowering the internal pressure of the gas supply passage 35.

In the curtain airbag device 10 according to the first exemplary embodiment, when the main chamber 36 does not deploy correctly, an increase in the internal pressure of the gas supply passage 35 can accordingly be suppressed. In comparison to the comparative example above, the load that acts on the occupant from the gas supply passage 35 can also accordingly be kept lower even when deployment of the main chamber 36 is impeded.

Due to disposing the internal pressure regulation structures 60 above the gas supply passage 35, gas from the gas supply passage 35 can be effectively accepted into the internal pressure regulation chambers 62 when deployment of the main chamber 36 below the gas supply passage 35 is impeded. Namely, the function of the internal pressure regulation chambers 62 is not impeded by obstacles positioned below the gas supply passage 35.

The internal pressure regulation structures 60 are disposed at a front portion of the curtain airbag 12 corresponding to portions further to the front side than in a normal sitting posture, corresponding to where the head of an occupant in an incorrect sitting posture may potentially be positioned (see the dummy heads H in FIG. 1). Gas can accordingly be released from the gas supply passage 35 in the vicinity of the occupant when deployment of the main chamber 36 is impeded by the occupant. The tear seam 66 therefore splits in a shorter time than in a comparative example in which for example the internal pressure regulation structures 60 are provided to a rear portion of the curtain airbag 12, thereby keeping the load that acts on the occupant from the gas supply passage 35 even smaller when deployment of the main chamber 36 is impeded.

Moreover, the gas release section is configured by providing the tear seam 66 to the release communication passage 64. That is to say, a highly reliable internal pressure regulation structure 60 can be obtained with a simple sewn structure.

By disposing the internal pressure regulation chambers 62 between the plural attachment tabs 46, an internal pressure regulation structure 60 that efficiently employs the space between the attachment tabs 46 can be provided. Moreover, a configuration provided with the internal pressure regulation structure 60 can be achieved whilst suppressing an increase in size of the base cloth that configures the curtain airbag 12. In other words, the manufacturing yield of the curtain airbag 12 provided with the internal pressure regulation structures 60 is superior to that of a configuration provided with internal pressure regulation chambers that project out further to the top than the attachment tabs 46. In the curtain airbag device 10, the desired gas release capacity can be secured by providing plural internal pressure regulation structures 60.

Second Exemplary Embodiment

Explanation follows regarding a curtain airbag device 70 according to a second exemplary embodiment of the present invention, with reference to FIG. 4. Note that portions with basically the same configuration to the first exemplary embodiment are allocated the same reference numbers as in the first exemplary embodiment and further illustration or explanation thereof may be omitted.

FIG. 4 is a schematic side view corresponding to FIG. 2 and illustrating a curtain airbag 72 configuring the curtain airbag device 70 according to the second exemplary embodiment. As shown in FIG. 4, the curtain airbag 72 differs from the curtain airbag 12 of the first exemplary embodiment in the respect that a single internal pressure regulation structure 74 is provided in place of the two internal pressure regulation structures 60.

More specifically, the internal pressure regulation structure 74 is configured including an internal pressure regulation chamber 76 that accepts gas from a gas supply passage 35, and a release communication passage 78 serving as a communication passage that communicates the gas supply passage 35 with the internal pressure regulation chamber 76. The release communication passage 78 is normally closed off by a tear seam 66, however the gas supply passage 35 and the internal pressure regulation chamber 76 are placed in communication with each other due to the tear seam 66 splitting when the internal pressure of the gas supply passage 35 reaches a specific pressure Ps or higher. The release communication passage 78 and the tear seam 66 accordingly correspond to the gas release section of the present invention.

In the present exemplary embodiment, the internal pressure regulation structure 74 is disposed above the gas supply passage 35. That is to say, the internal pressure regulation chamber 76 is disposed to the top side of the gas supply passage 35, and the release communication passage 78 connects an upper edge of the gas supply passage 35 and the internal pressure regulation chamber 76 by the shortest distance (in a straight line shape). According to this arrangement, when the internal pressure of the gas supply passage 35 reaches the specific pressure Ps or greater due for example to deployment of the main chamber 36 being impeded, the configuration exhibits a function to release gas through the release communication passage 78 to the internal pressure regulation chamber 76. Moreover, in the curtain airbag 72 the internal pressure regulation structure 74 is disposed above a front portion of a front main chamber 36F, similarly to the arrangement of the internal pressure regulation structures 60 in the curtain airbag 12.

In the present exemplary embodiment, the internal pressure regulation chamber 76 is configured extending along the front-rear direction above plural attachment tabs 46. Namely, the internal pressure regulation chamber 76 is configured with a larger gas acceptance capacity than the internal pressure regulation chambers 62. In the present exemplary embodiment, the gas acceptance capacity of the internal pressure regulation chamber 76 is set larger than the sum of the gas acceptance capacities of the two internal pressure regulation chambers 62.

The release communication passage 78 passes between the plural attachment tabs 46, and is configured to connect the gas supply passage 35 and the internal pressure regulation chamber 76 to enable communication between the gas supply passage 35 and the internal pressure regulation chamber 76. At least a portion of the internal pressure regulation chamber 76 and the release communication passage 78 may be disposed at a roof side portion 18 together with other portions of the curtain airbag 72, or may be disposed separately to other portions of the curtain airbag 72 between a roof panel and a roof headlining. Other portions of the curtain airbag device 70, including those portions not illustrated, are configured similarly to corresponding portions of the curtain airbag device 10.

The curtain airbag device 70 according to the second exemplary embodiment therefore exhibits basically the same operation and advantageous effects as the curtain airbag device 10 according to the first exemplary embodiment. Moreover, in the curtain airbag device 70 there are few limitations to the gas acceptance capacity of the internal pressure regulation chamber 76 since the internal pressure regulation chamber 76 is configured so as to project out further from the gas supply passage 35 than the attachment tabs 46. When deployment of the main chamber 36 is impeded, the internal pressure of the gas supply passage 35 can accordingly be suppressed to a lower level since the internal pressure regulation chamber 76 with a higher gas acceptance capacity than the internal pressure regulation chamber 62 of the first exemplary embodiment can be employed. In the present exemplary embodiment, an equal or greater internal pressure increase suppression effect to that of the two internal pressure regulation structures 60 can be obtained with the single internal pressure regulation structure 74.

Note that in each of the exemplary embodiments described above, examples are given in which the curtain airbags 12, 72 include the front auxiliary chamber 40 and the rear auxiliary chamber 42 for protecting the occupants against roll-over, however the present invention is not limited thereto. For example, configuration may be made in which one or both of the front auxiliary chamber 40 and the rear auxiliary chamber 42 are not provided.

In each of the exemplary embodiments described above, examples are given in which the internal pressure regulation structures 60, 74 release gas from an uppermost portion of the gas supply passage 35, however the present invention is not limited thereto. For example, configuration may be made wherein gas is released from for example a side portion or from the front-rear direction end portions of the gas supply passage 35. However it is preferable to arrange that gas is to be released from above the center of gravity position of the head in configurations in which gas is released from in the vicinity of the head of an occupant who is in an incorrect sitting posture in the front-rear direction (the dummy heads H).

In each of the exemplary embodiments described above, examples are given in which the release communication passages 64, 78 are closed off by the tear seam 66, however the present invention is not limited thereto. Configuration is preferably adopted wherein the release communication passages 64, 76 are opened by the internal pressure of the gas supply passage 35 at the specific pressure Ps or higher. As an example of such a configuration, the base cloths configuring the release communication passages 64, 78 are adhered with adhesive, closing off the release communication passages 64, 78, with the release communication passages 64, 78 being opened due to the adhesive coming apart when the internal pressure of the gas supply passage 35 reaches the specific pressure Ps or higher.

In each of the exemplary embodiments described above, examples are given in which the curtain airbags 12, 72 are provided to both the driving seat side and the passenger seat side, however the present invention is not limited thereto. For example a curtain airbag device may be employed wherein the internal pressure regulation structures 60, 74 are not provided on the driving seat side at which due to driving a normal sitting posture is easily maintained, with the curtain airbag 12, 72 provided on the passenger seat side.

Moreover, in each of the exemplary embodiments described above, examples are given in which the internal pressure regulation structures 60, 74 are provided for a front seat occupant, however the present invention is not limited thereto. For example, configuration may be made wherein the internal pressure regulation structures 60, 74 are provided above the rear main chamber 36R or the rear auxiliary chamber 42 on the rear seat side in addition to, or in place of, the front seat internal pressure regulation structures 60, 74.

Obviously, various other modifications may be implemented within a range not departing from the spirit of the present invention.

What is claimed is:

1. A curtain airbag device that is housed at a top edge portion of a side window glass placement location of a vehicle body, the curtain airbag device comprising:
a gas supply passage that receives supplied gas and is deployed along a top portion of the side window glass placement location and towards a vehicle bottom direction;
an occupant protection portion that is deployed to a lower side of the gas supply passage by receiving supplied gas through the gas supply passage;
a gas release section that releases gas from inside the gas supply passage when an internal pressure of the gas supply passage reaches a specific pressure or higher, the specific pressure being higher than a design deployment pressure;
a plurality of attachment tabs that project out towards a vehicle top from a vehicle top end side of the gas supply passage at intervals along a vehicle front-rear direction, the plurality of attachment tabs are respectively attached to the top edge portion; and
an internal pressure regulation chamber that accepts gas released by the gas release section, the internal pressure regulation chamber is integrally provided to the gas supply passage at a vehicle top side of the gas supply passage, the internal pressure regulation chamber is disposed between the plurality of attachment tabs;
wherein the gas release section is configured such that when the internal pressure of the gas supply passage reaches the specific pressure or higher, the internal pressure causes a closed-off state between the gas supply passage and the internal pressure regulation chamber to change to a communicated state.

2. The curtain airbag device of claim 1 wherein:
the curtain airbag device further comprises a plurality of attachment tabs that project out towards the vehicle top from a vehicle top end side of the gas supply passage at intervals along the vehicle front-rear direction, and that are respectively attached to the top edge portion; and
the internal pressure regulation chamber projects out further than the plurality of attachment tabs with respect to the gas supply passage.

3. The curtain airbag device of claim 1, wherein the gas release section is configured such that a communication passage between the gas supply passage and the internal pressure regulation chamber is closed-off by sewing or adhering so as to split or come apart due to the internal pressure reaching the specific pressure or higher.

4. The curtain airbag device of claim 1 wherein a plurality of the gas release sections and a plurality of the internal pressure regulation chambers are provided.

5. The curtain airbag device of claim 1 wherein:
the occupant protection portion comprises a front main chamber that protects a front seat occupant and a rear main chamber that protects a rear seat occupant; and
the gas release section and the internal pressure regulation chamber are disposed at a vehicle front side of the front main chamber and to the vehicle top side with respect to the gas supply passage.

6. A curtain airbag device comprising:
a curtain airbag that is housed in a folded up state at a top edge portion of a side window glass placement location of a vehicle body, and that receives supplied gas and is deployed along the side window glass and towards a vehicle bottom direction;
a gas release section that releases gas inside the curtain airbag from an upper portion of the curtain airbag when internal pressure of the curtain airbag reaches a specific pressure or higher, the specific pressure being higher than a design deployment pressure;
a plurality of attachment tabs that project out towards a vehicle top from a vehicle top end side of the curtain airbag at intervals along a vehicle front-rear direction, the plurality of attachment tabs are respectively attached to the top edge portion; and an internal pressure regulation chamber that accepts gas released by the gas release section, the internal pressure regulation chamber is integrally provided to the curtain airbag at a vehicle top side of the curtain airbag, the internal pressure regulation chamber is disposed between the plurality of attachment tabs;

wherein the gas release section is configured such that the internal pressure at the specific pressure of higher causes a closed-off state between the curtain airbag and the internal pressure regulation chamber to change to a communicated state.

* * * * *